United States Patent
Warren et al.

(10) Patent No.: US 7,003,599 B2
(45) Date of Patent: Feb. 21, 2006

(54) PIPELINED, UNIVERSAL SERIAL BUS PARALLEL FRAME DELINEATOR AND NRZI DECODER

(75) Inventors: Dean Warren, Carlton, OR (US); Jonathan C. Lueker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 10/041,848

(22) Filed: Oct. 24, 2001

(65) Prior Publication Data

US 2003/0079071 A1    Apr. 24, 2003

(51) Int. Cl.
    *G06F 13/40*    (2006.01)
(52) U.S. Cl. ......................... 710/71; 710/307
(58) Field of Classification Search ................ 710/107, 710/71, 307
    See application file for complete search history.

(56) References Cited

U.S. PATENT DOCUMENTS

| | | | |
|---|---|---|---|
| 4,346,440 A * | 8/1982 | Kyu et al. ................ 709/236 |
| 4,746,997 A * | 5/1988 | Shrinkle et al. ............ 360/49 |
| 4,847,703 A * | 7/1989 | Sakata et al. ............... 360/48 |
| 5,081,654 A * | 1/1992 | Stephenson et al. ........ 375/368 |
| 5,812,777 A * | 9/1998 | Leigh ........................ 709/217 |
| 5,884,086 A * | 3/1999 | Amoni et al. ............... 713/300 |
| 6,041,430 A * | 3/2000 | Yamauchi ................... 714/752 |
| 6,094,443 A * | 7/2000 | Dwork ....................... 370/510 |
| 6,356,582 B1 * | 3/2002 | Mazer et al. ............... 375/219 |
| 6,707,396 B1 * | 3/2004 | Govindaraman ............ 341/50 |
| 6,732,204 B1 * | 5/2004 | Ishida ........................ 710/71 |
| 2002/0141450 A1 * | 10/2002 | Duvvuru ..................... 370/476 |

OTHER PUBLICATIONS

Universal Serial Bus Specification Revision 1.0 Jan. 15, 1996.*

* cited by examiner

Primary Examiner—Paul R. Myers
(74) Attorney, Agent, or Firm—Paul E. Steiner

(57) ABSTRACT

A pipelined Universal Serial Bus (USB) parallel frame delineator and non-return to zero invert (NRZI) decoder is described. Using a three-stage pipeline and parallel data stream processing, a USB transceiver delineates received asynchronous frame boundaries within a USB peripheral NRZI data stream. Using asynchronous parallel data stream processing the USB transceiver concurrently decodes received NRZI encoded data.

19 Claims, 13 Drawing Sheets

PIPELINED, UNIVERSAL SERIAL BUS PARALLEL FRAME DELINEATOR AND NRZI DECODER

FIELD OF THE INVENTION

The present invention relates generally to computer systems and more specifically to the operation of a universal serial bus in a computer system.

BACKGROUND OF THE INVENTION

Data communications is the transmission of data from one computer or device to another. A Universal Serial Bus is an external peripheral interface standard for data communications between a computer and external peripherals. A Universal Serial Bus follows a data communications protocol defined in the Universal Serial Bus (USB) specification version 1.1.

Recently, a USB specification version 2.0 was made available. USB specification version 1.1 supports two different rates for transmitting data: 1.5 megabits per second (Mbps) for low-speed devices and 12 Mbps for high-speed devices. USB specification 2.0 extends the rate for transferring data from 12 Mbps on USB 1.1 up to 480 Mbps on USB 2.0.

In some digital data communication arrangements, incoming received serial data bit streams must be processed faster than the frequency of the available clock. In serial digital communications, this can be characterized as the problem of processing more than one bit of information per unit bit time. Parallel concurrent techniques that process more than one serial data bit per unit bit time are needed to solve this problem. In particular, a USB 2.0 transmitting device transmits digital bits over a USB cable at a rate of 480 MHz (2.08 nsec). This high frequency makes it very difficult for a USB receiving device to process incoming bits at the frequency that the transmitter used to transmit the USB data bits. The USB 2.0 specification does not provide a technique to solve this problem thus a novel parallel, concurrent bit processing technique is needed for processing incoming data from a USB 2.0 transmitting device.

It is also common in some digital data communication arrangements for incoming serial data streams to be received in the form of packets which contain a very specific serial data pattern that delineates a start of packet (SOP). However, a problem encountered in digital communication using USB is detecting the first received bit of an incoming packet from the incoming serial data stream. The USB 2.0 specification provides a specific SOP pattern that indicates which bit in the data stream is the first bit of the USB data packet, but it does not provide a technique to detect the SOP pattern. Once the SOP is detected, the incoming bit stream must be aligned into eight bit fields of data that can be assembled byte by byte into a packet for use by upstream USB devices as further described in U.S. patent application Ser. No. 09/866,150 entitled "Concurrent Asynchronous USB Data Stream Destuffer With Variable Width Bit-Wise Memory Controller" which is assigned to the assignee of the present invention. Providing a technique to detect the SOP in the received data stream is further complicated by the 480 MHz bit rate of the incoming data stream. A technique is needed to detect a USB 2.0 SOP pattern and to align the USB data.

It is also common in some digital data communication arrangements for incoming serial data streams to be received in the form of encoded data bits that must be decoded prior to being utilized by functions that reside further upstream from the received bits. Since the USB 2.0 transmitter NRZI (NonReturn-to-Zero Inverted) encodes each bit prior to transmission on the USB wire, the received bit stream must be decoded as the bits are assembled into USB packets for use by upstream functions that are not able to utilize NRZI encoded data. A technique is needed to perform this NRZI decode operation after the USB data stream SOP has been detected and as the data stream is being parsed into a packet.

As described above, currently available USB 1.1 peripheral implementations run at a maximum data rate of 12 Mbps and use a 12 MHz clock to process the incoming data stream using bit level state machines. If this approach is also used in USB 2.0, bit level state machines running at 480 MHz would be needed. Processing incoming data at this clock rate would present very difficult design challenges and add significant cost to the peripheral controller. Therefore, there is a need for a system that is capable of processing incoming USB 2.0 data at a faster rate without substantially increasing the implementation costs and complexity.

DESCRIPTION OF THE EMBODIMENTS

A novel pipelined USB parallel frame delineator and NRZI decoder is described. In the following detailed description of the embodiments, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Figure 1:
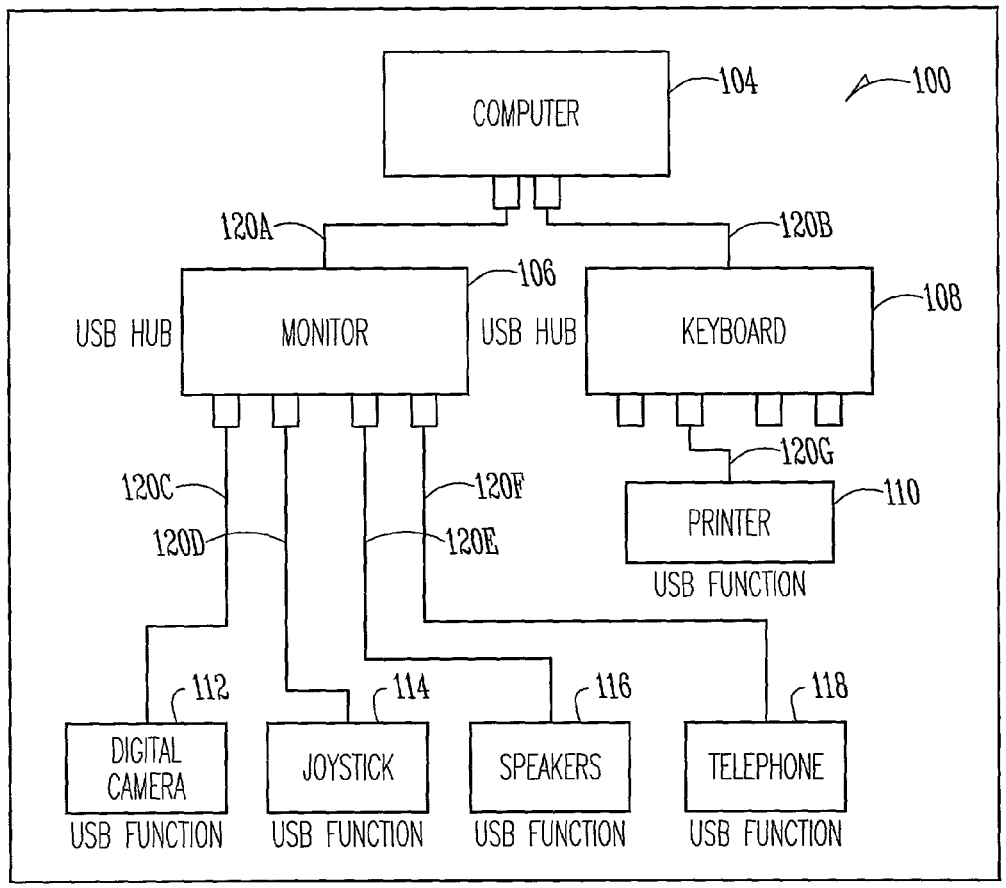
FIG. 1 is a diagram of an example USB-based computer system.

FIG. 1 is a diagram of an example USB-based computer system 100. The computer system of FIG. 1 comprises a USB host controller, such as computer 104, attached to one or more hubs 106, 108. One or more USB devices 110, 112, 114, 116, 118 are connected to the hubs 106, 108. The computer 104, hubs 106, 108 and USB devices 106, 108, 110, 112, 114, 116, 118 are communicatively coupled with USB cables 120a–120g. The computer 104 runs software to manage the USB hubs and devices. Example functions of the software include managing dynamic attachment/detachment of hubs and devices as well as power management. The computer system 100 comprises two hubs 106, 108. In the example shown in FIG. 1, the hubs 106, 108 are multi-port hubs incorporated in USB devices (a monitor 106 and a keyboard 108). In alternate embodiments, the hubs are stand-alone devices. The hubs 106, 108 provide connectivity for additional USB devices 110, 112, 114, 116, 118. In the example shown in FIG. 1, the USB devices include a printer 110, a digital camera 112, a joystick 114, speakers 116 and a telephone 118. The USB devices 110, 112, 114, 116, 118 react to the transactions sent by the host controller (computer 104). As shown in FIG. 1, the USB is set up in a tiered topology with a host controller 104 on the top tier and USB hubs 106, 108 and devices (also referred to as functions) 110, 112, 114, 116, 118 on subsequent tiers.

Figure 2:
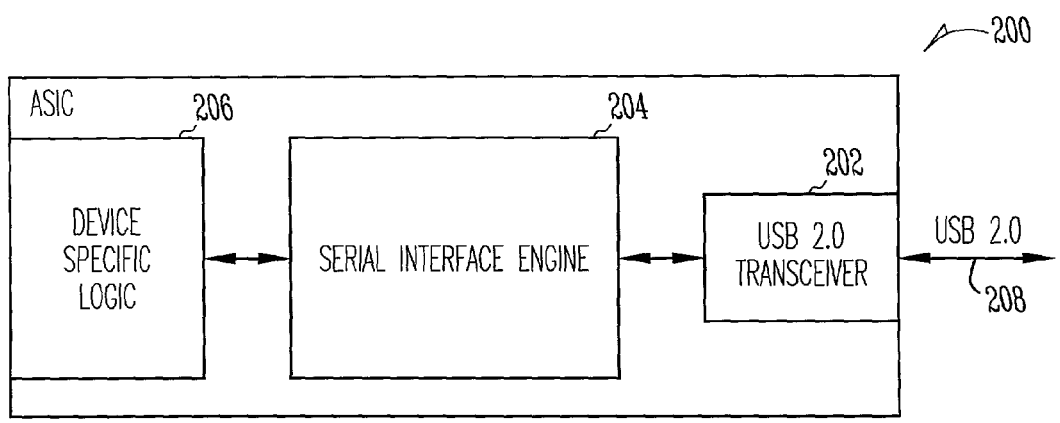
FIG. 2 is a high-level block diagram of an Application Specific Integrated Circuit (ASIC) for an example USB device.

FIG. 2 is a high-level block diagram of an Application Specific Integrated Circuit (ASIC) 200 for an example USB device. Each USB device, whether it is a hub or a function, has associated therewith a serial interface engine (SIE) which provides an interface between the hub or function and the transceiver which transmits or receives signals across a serial communications line 208. As shown in FIG. 2, the ASIC 200 comprises a USB transceiver 202, a serial interface engine 204 and device specific logic 206.

Figure 3:
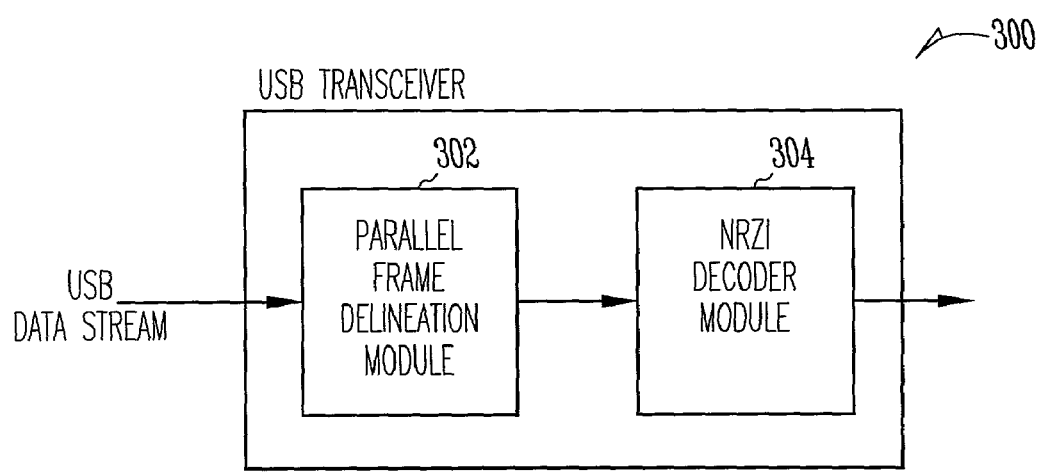
FIG. 3 is a high-level block diagram of a novel USB transceiver according to one embodiment of the invention.

FIG. 3 is a high-level block diagram of a novel USB transceiver 300 according to one embodiment of the invention. In one embodiment, the USB transceiver 300 follows a protocol defined in version 2.0 of the USB specification. The USB transceiver 300 comprises a parallel frame delineation module 302 and a NRZI decoder module 304. Using a three-stage pipeline and parallel data stream processing the USB transceiver 300 delineates received asynchronous frame boundaries within a USB 2.0 peripheral NRZI data stream. Also using asynchronous parallel data stream processing the USB transceiver 300 concurrently decodes received NRZI encoded data.

Figure 4:
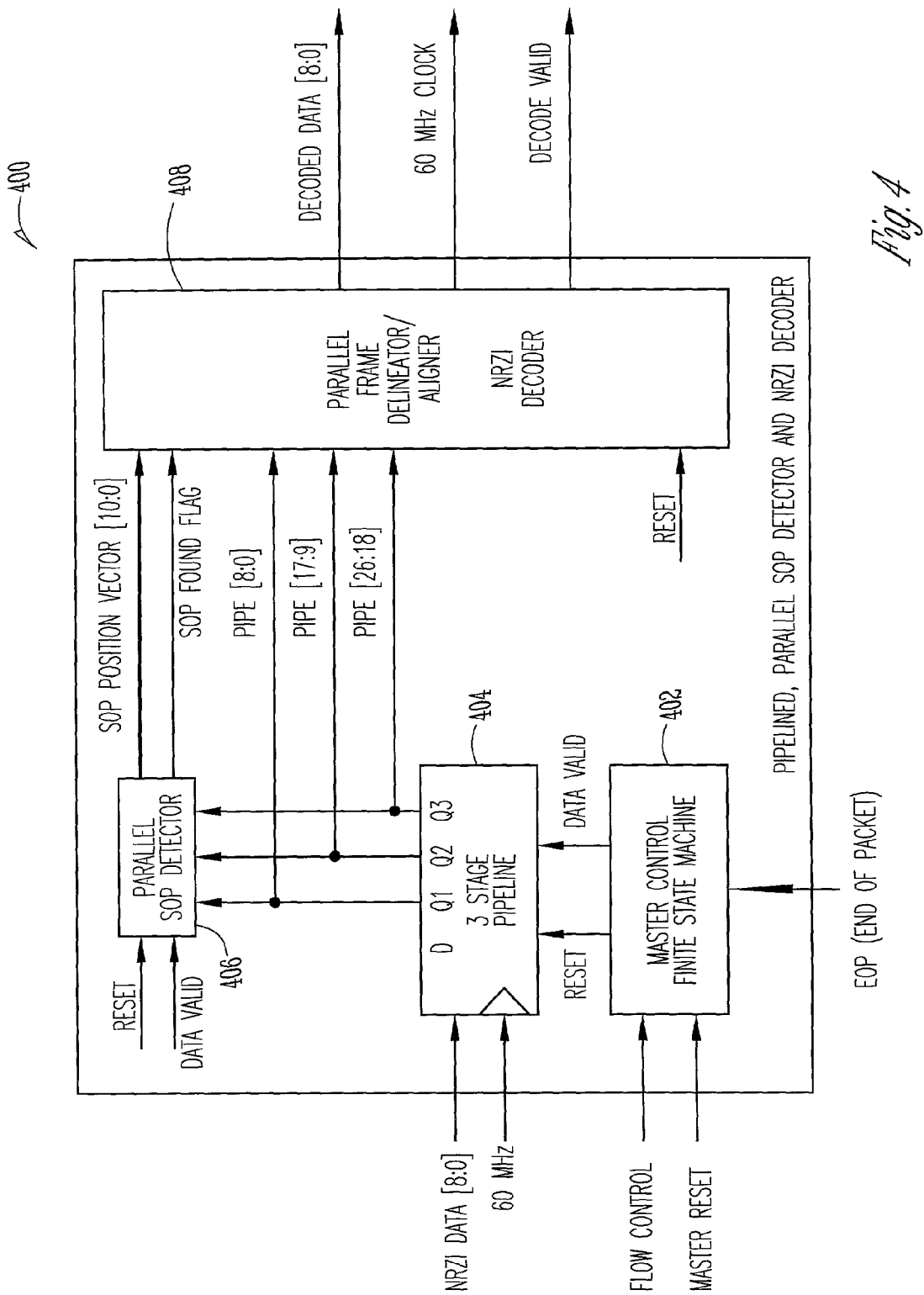
FIG. 4 is a more detailed block diagram of an example embodiment of the USB transceiver shown in FIG. 3.

FIG. 4 is a more detailed block diagram of an example embodiment of the USB transceiver shown in FIG. 3. The USB transceiver 400 shown in FIG. 4 comprises a master control finite state machine 402, a three-stage pipeline 404, a parallel start of packet (SOP) detector 406 and a parallel frame delineator/aligner and NRZI decoder 408. The master control finite state machine 402 determines when the transceiver 400 should be reset/cleared and when valid data is being received, and is described in more detail by reference to FIGS. 16 and 17. The three-stage pipeline 404 is loaded with consecutive nine-bit fields of data from an incoming USB data stream and is described in more detail by reference to FIG. 5. The parallel start of packet detector 406 uses concurrent comparators to identify a frame delineation marker in the incoming USB data stream and is described in more detail by reference to FIGS. 6, 7, 8, 9 and 10. The parallel frame delineator/aligner and NRZI decoder 408 decodes received NRZI encoded data using asynchronous parallel data processing, and is described in more detail by reference to FIGS. 11, 12, 13, 14 and 15.

Figure 5:
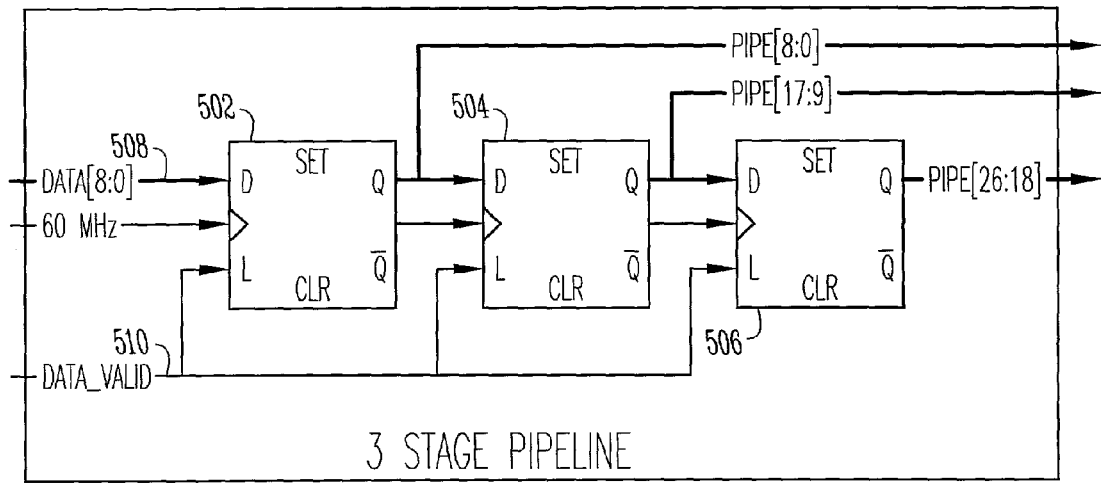
FIG. 5 is a more detailed block diagram of an example three-stage pipeline in the USB transceiver shown in FIG. 4.

Three-stage pipeline. FIG. 5 is a more detailed block diagram of the three-stage pipeline 404 of FIG. 4. An example embodiment of the three-stage pipeline 404 shown in FIG. 5 comprises three D-type flip-flops (also referred to as latches) 502, 504, 506. The flip-flops 502, 504, 506 receive data 508 from an incoming data stream as nine-bit fields. The nine-bit fields of data 508 are received at a clock rate of 60 MHz. A data valid signal 510 is connected to each one of the flip-flops 502, 504, 506 and is used as a flow control mechanism. The flip-flops 502, 504, 506 are loaded when a nine-bit field of data 508 is available and the data valid signal 510 is asserted. Using the embodiment of the three-stage pipeline 404 shown in FIG. 5, twenty-seven bits of data are available to the parallel start of packet detector (406 in FIG. 4) at any given time after the pipeline is loaded.

In operation, the three-stage pipeline 404 is loaded with consecutive nine-bit fields of data from the incoming data stream. For example, at time T=0, the three-stage pipeline 404 is in an initial state and does not contain valid data. At time T=1 a first one of the three flip-flops 502 (a first stage of the pipeline) receives nine bits of data. At time T=2 the nine bits of data stored by the first one of the three flip-flops 502 are shifted to a second one of the three flip-flops 504 (a second stage of the pipeline). The next consecutive nine-bit data field in the incoming data stream is then stored in the first one of the three flip-flops 502. At time T=3 the nine bits of data stored by the second one of the three flip-flops 504 are shifted to a third one of the three flip-flops 506 (a third stage of the pipeline). The nine bits of data stored by the first one of the three flip-flops 502 are shifted to the second one of the three flip-flops 504; and the next consecutive nine-bit data field in the incoming data stream is stored in the first one of the three flip-flops 502. After three clock periods, the three-stage pipeline 404 is loaded. The operations to load the three-stage pipeline with data are summarized below:

T=0, pipe is in the initial state
T=1, pipe[8:0]←incoming data[8:0]
T=2, pipe[17:9]←pipe[8:0], pipe[8:0]←incoming data[8:0]
T=3, pipe[26:18]←pipe[17:9], pipe[17:9]←pipe[8:0], pipe[8:0]←incoming data[8:0]

The parallel SOP detector (406 in FIG. 4) receives twenty-seven bits of data in parallel from the three-stage pipeline shown in FIG. 5. The operation of the parallel start of packet detector is described in detail by reference to FIGS. 6, 7, 8, 9 and 10. The parallel start of packet detector searches for a frame delineation marker in the data received using concurrent comparators.

Figure 6:
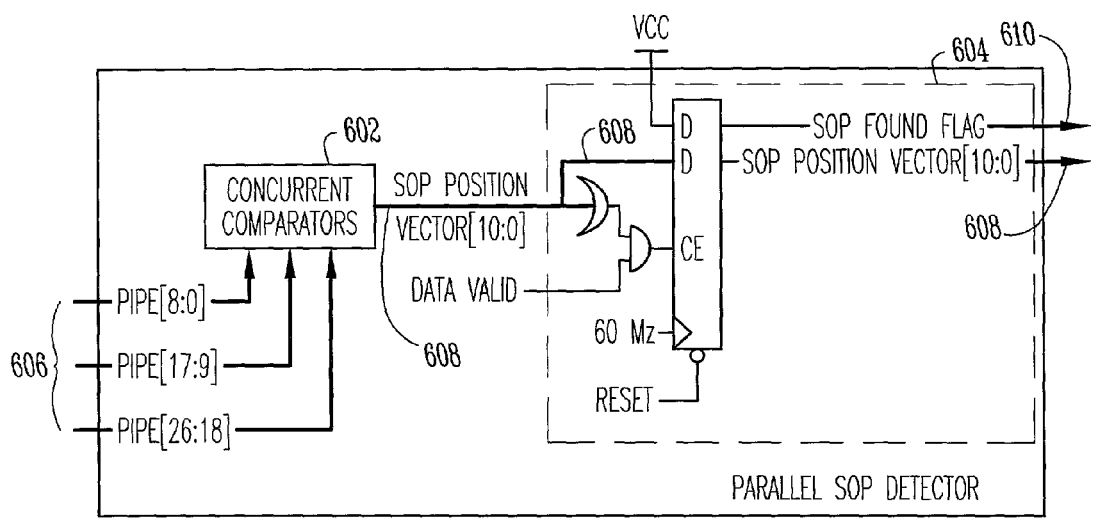
FIG. 6 is a more detailed block diagram of an example parallel start of packet (SOP) detector in the USB transceiver shown in FIG. 4.

Parallel SOP Detector. FIG. 6 is a more detailed block diagram of the example parallel start of packet (SOP) detector 406 in the USB transceiver shown in FIG. 4. As shown in FIG. 6, the example parallel SOP detector 406 comprises a plurality of concurrent comparators 602 and latch logic 604. In one embodiment, the number of concurrent comparators 602 is eleven. The concurrent comparators 602 receive twenty-seven bits of data 606 from the three-stage pipeline shown in FIG. 5. The concurrent comparators 602 scan the twenty-seven bits of data 606 for a frame delineation marker. In one embodiment, the frame delineation marker is the SOP pattern "00101010". An output of the concurrent comparators 602 forms a position vector. The position vector indicates a location of a frame boundary in the data stream, and is described in more detail by reference to FIG. 8. The latch logic 604 receives the position vector from the concurrent comparators 602. When a SOP pattern is detected, latch logic 604 latches the position vector 608. Latch logic 604 also sets a SOP found flag 610 when the location of the SOP pattern is latched. The SOP found flag 610 is used to indicate to the NRZI decoder that data decoding can begin.

Figure 7:
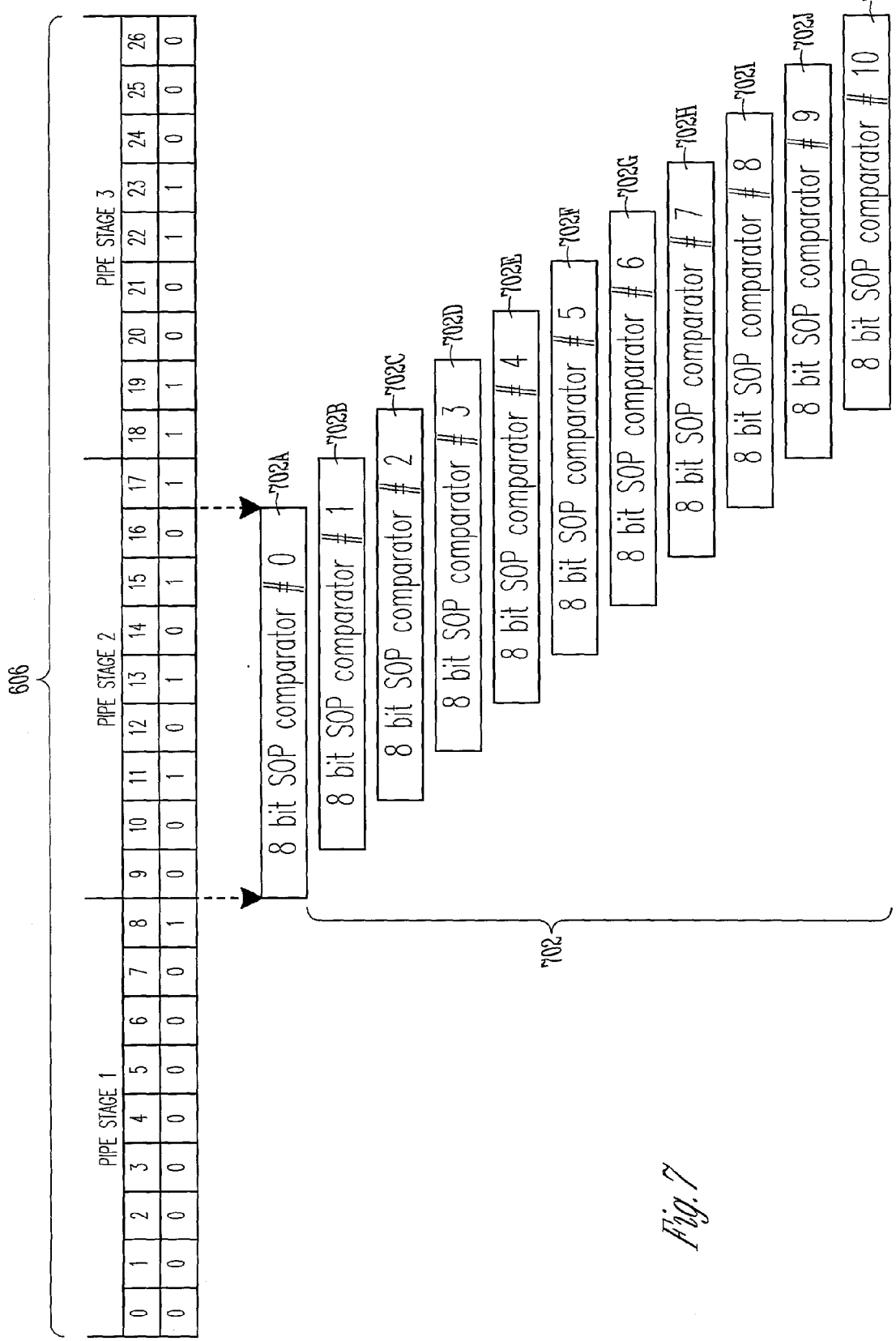
FIG. 7 is a block diagram of concurrent comparators and twenty-seven bits of data received by the parallel start of packet detector shown in FIG. 6.

An example embodiment of the concurrent comparators 602 is described by reference to FIGS. 7, 8, 9 and 10. FIG. 7 is a block diagram of eleven concurrent comparators 702 and twenty-seven bits of data 606. The twenty-seven bits of data 606 are received by the parallel SOP detector 406 as shown in FIG. 6. The twenty-seven bits of data 606 comprise bit positions 0–26. Bits 0–8 are received from a first stage of the pipeline shown in FIG. 5. Bits 9–17 are received from a second stage of the pipeline shown in FIG. 5. Bits 18–26 are received from a third stage of the pipeline shown in FIG. 5. The most recently received bit in the twenty-seven bits of data 606 is in bit position 0. The least recently received bit in the twenty-seven bits of data 606 is in bit position 26.

In the example shown in FIG. 7, eleven concurrent comparators 702 scan the incoming twenty-seven bits of data for a SOP pattern of "00101010". The eleven concurrent comparators 702 are numbered zero through ten. The eight-bit SOP comparator #0 702a compares bits 9–16 in the twenty-seven bits of data 606 with the SOP pattern "00101010". The eight-bit SOP comparator #1 702b compares bits 10–17 with the SOP pattern "00101010". The eight-bit SOP comparator #2 702c compares bits 11–18 with the SOP pattern "00101010". The eight-bit SOP comparator #3 702d compares bits 12–19 with the SOP pattern "00101010". The eight-bit SOP comparator #4 702e compares bits 13–20 with the SOP pattern "00101010". The eight-bit SOP comparator #5 702f compares bits 14–21 with the SOP pattern "00101010". The eight-bit SOP comparator #6 702g compares bits 15–22 with the SOP pattern "00101010". The eight-bit SOP comparator #7 702h compares bits 16–23 with the SOP pattern "00101010". The eight-bit SOP comparator #8 702i compares bits 17–24 with the SOP pattern "00101010". The eight-bit SOP comparator #9 702j compares bits 18–25 with the SOP pattern "00101010". The eight-bit SOP comparator #10 702k compares bits 19–26 with the SOP pattern "00101010".

As shown in the example embodiment in FIG. 7, eleven parallel eight-bit comparators are used to scan the incoming data for a SOP pattern of "00101010". Upon detection of the SOP pattern in the incoming data stream, the location of the SOP pattern is latched by the latch logic (604 in FIG. 6) and the concurrent comparators stop searching for the duration of the current packet. In the example shown in FIG. 7, the SOP pattern is found in bits 9–16 of the twenty-seven bits of data 606. The first nine-bit field of data corresponding to the SOP pattern found in bit positions 9–16 is located in bit positions 0–8.

Figure 8:
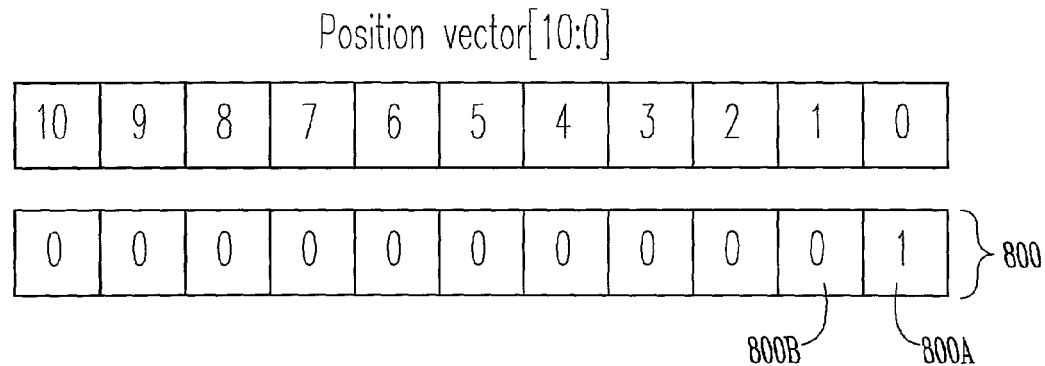
FIG. 8 is a block diagram of an example position vector generated by the parallel SOP detector shown in FIG. 6.

FIG. 8 is a block diagram of an example position vector 800 generated by the parallel SOP detector shown in FIG. 6. In one embodiment, the position vector 800 is an eleven-bit field. However, the position vector 800 is not limited to an eleven-bit field. In one embodiment, the number of bits in the position vector corresponds to the number of comparators in the parallel SOP detector shown in FIG. 6. Each one of the comparators generates a single bit output representing the value of a one or a zero. The position vector 800 is comprised of values representing the single bit outputs from each one of the comparators. In the example shown in FIG. 8, the position vector 800 has eleven bit positions representing the eleven comparators shown in FIG. 7. The position vector 800 comprises the outputs from comparator #0 (702a in FIG. 7) through comparator #10 (702k in FIG. 7). The output from comparator #0 (702a in FIG. 7) is represented by the value of the bit in position zero 800a of the position vector 800. The output from comparator #1 (702b in FIG. 7) is represented by the value of the bit in position one 800b of the position vector 800, and so on. The position vector 800 identifies a position in the twenty-seven bits of data in which the SOP pattern is found. In the example shown in FIG. 7, the SOP pattern is found in bits 9–16 of the twenty-seven bits of data. The position vector 800 has a one in bit position zero 800a to indicate that the SOP pattern was found by comparator #0.

Figure 9:
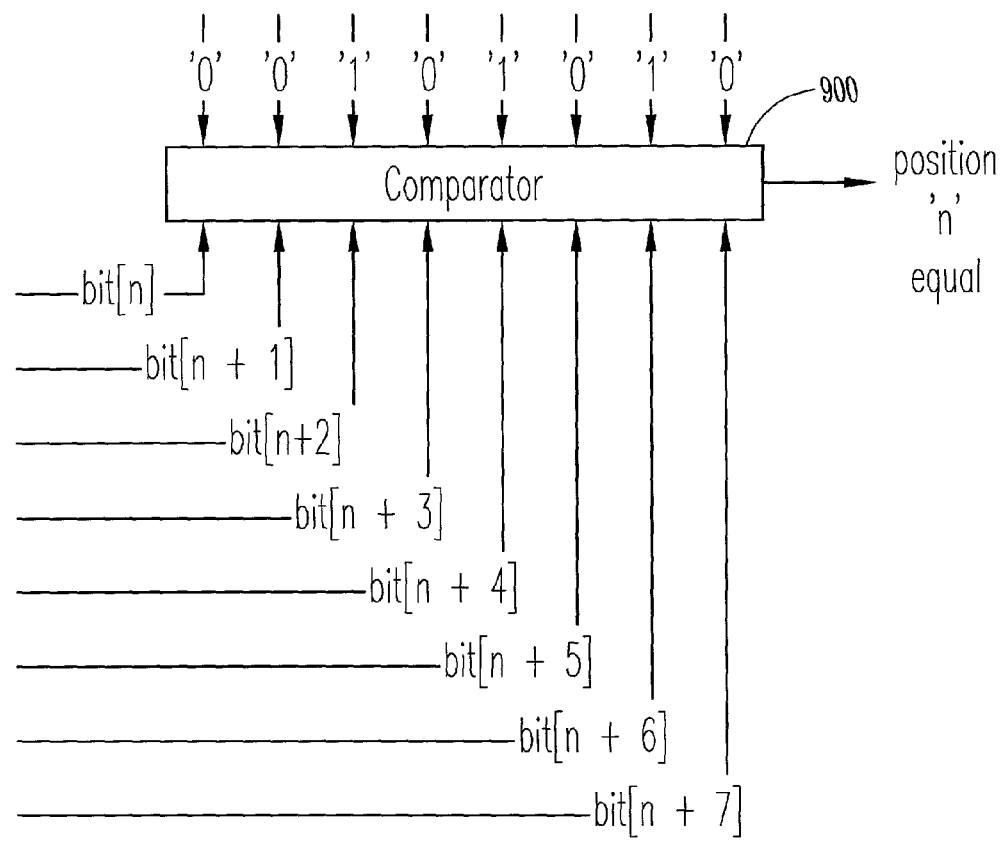
FIG. 9 is a more detailed block diagram of one of the concurrent comparators shown in FIG. 7.

FIG. 9 is a more detailed block diagram of one of the eleven concurrent comparators shown in FIG. 7. As shown in FIG. 9, comparator 900 compares eight bits of data (bit[n]-bit[n+7]) with the SOP pattern "00101010". If the eight bits of data match the SOP pattern '00101010', then the output of the comparator is set to indicate that the eight bits of data beginning at bit position 'n' equal the SOP pattern. Referring back to the example shown in FIG. 7, the eight bits of data beginning at bit position 9 are equal to the SOP pattern "00101010". The output of the comparator 900 is represented by the value of one bit in a position vector, such as the position vector shown in FIG. 8.

Figure 10:
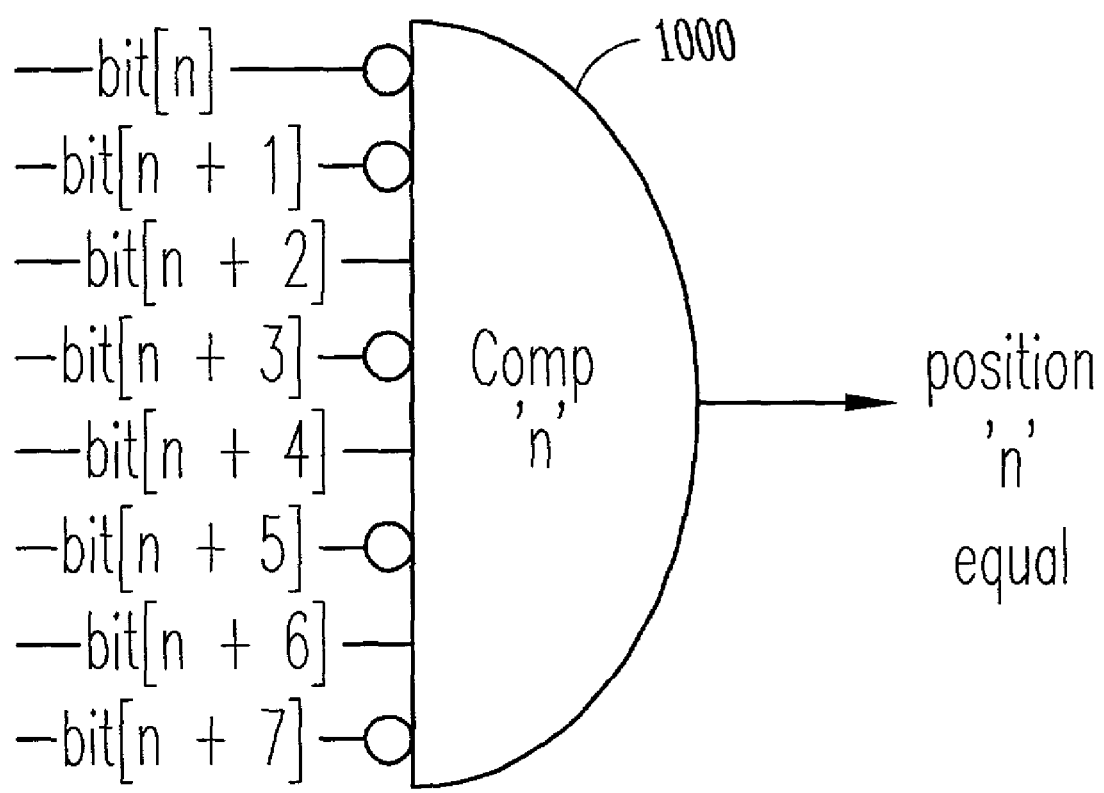
FIG. 10 is an example embodiment of the concurrent comparator shown in FIG. 9.

FIG. 10 is an example embodiment of the comparator shown in FIG. 9. The example comparator 1000 in FIG. 10 is an eight-input AND gate. The eight-input AND gate has inverters on the input lines for bit[n], bit[n+1], bit[n+3], bit[n+5] and bit[n+7]. If the values represented by each one of bit[n], bit[n+1], bit[n+3] bit[n+5] and bit[n+7] are zero and the values represented by each one of bit[n+2], bit[n+4] and bit[n+6] are one, then the output of the comparator 1000 is a value representing a one. When the output of comparator 1000 represents a one, the inputs to comparator 1000 represent SOP pattern "00101010". The output of the comparator 1000 is represented by a value in a position vector such as the position vector shown in FIG. 8.

The three-stage pipeline and the parallel start of packet detector have been described by reference to FIGS. 5, 6, 7, 8, 9 and 10. The three-stage pipeline is loaded with consecutive nine-bit fields of data from an incoming USB data stream. The parallel start of packet detector uses concurrent comparators to identify a frame delineation marker in the incoming USB data stream. A parallel frame delineator/aligner and NRZI decoder are described in the next section of the detailed description. The frame delineator/aligner and NRZI decoder convert the incoming twenty-seven bits of data into nine-bit NRZI decoded data fields.

Figure 11:
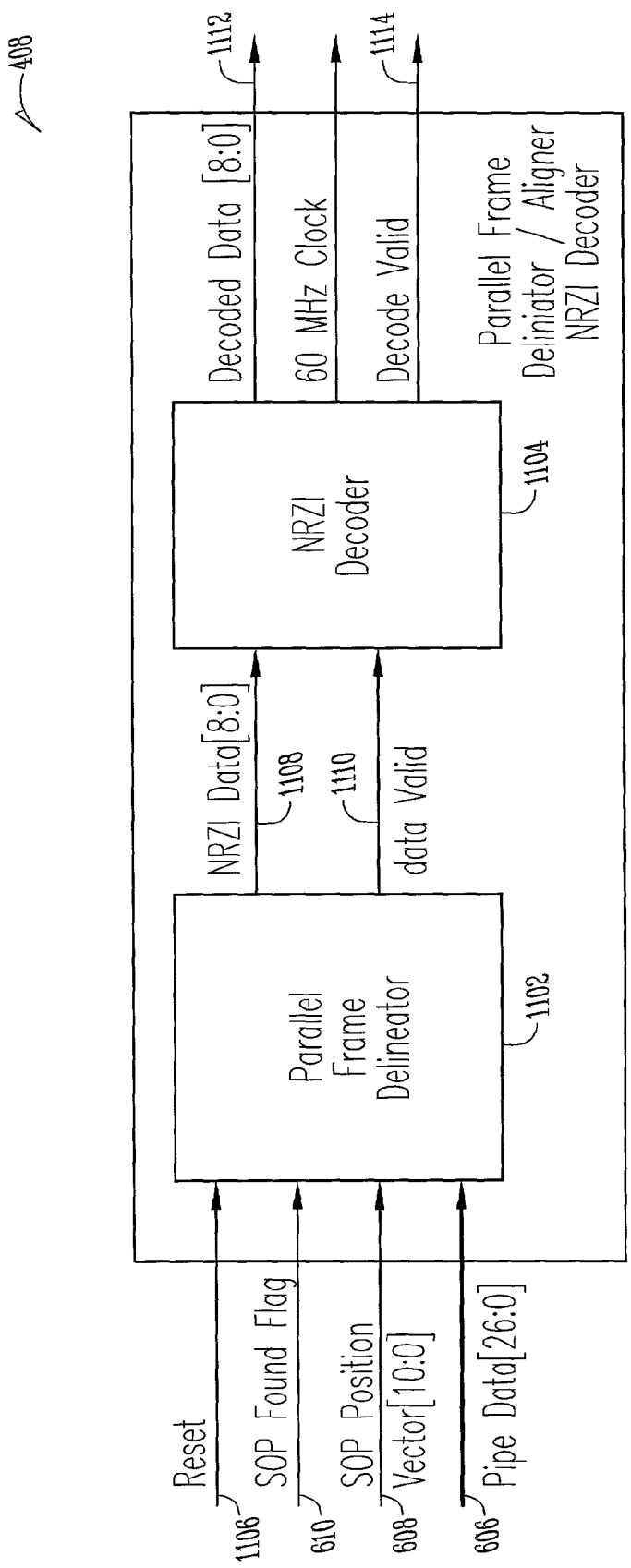
FIG. 11 is a high-level block diagram of the parallel frame delineator/aligner and NRZI decoder shown in FIG. 4.

Parallel Frame Delineator/Aligner and NRZI Decoder. FIG. 11 is a high-level block diagram of parallel frame delineator/aligner and NRZI decoder 408 of FIG. 4. As shown in FIG. 11, the parallel frame delineator/aligner and NRZI decoder 408 comprises a parallel frame delineator 1102 and a NRZI decoder 1104. The parallel frame delineator 1102 receives twenty-seven bits of data 606 from the three-stage pipeline shown in FIG. 4. The parallel frame delineator 1102 also receives the position vector 608 and the SOP found flag 610 from the parallel SOP detector 406 shown in FIG. 4. The parallel frame delineator 1102 also receives a reset signal 1106. The parallel frame delineator 1102 provides nine-bit fields of NRZI data 1108 and a data valid signal 1110 to the NRZI decoder 1104. The NRZI decoder 1104 decodes received NRZI encoded data. The NRZI decoder 1104 receives the nine bits of NRZI data 1108 and a data valid signal 1110 from the parallel frame delineator 1102. The NRZI decoder 1104 generates nine bits of decoded data 1112 and a decode valid signal 1114.

Figure 12:
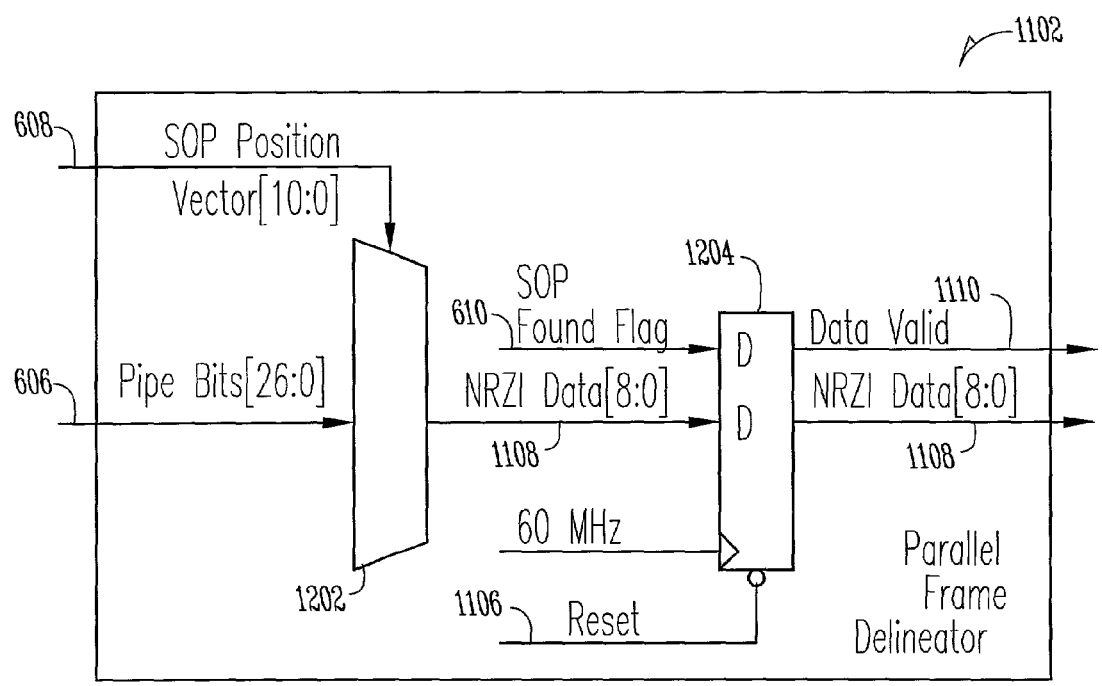
FIG. 12 is a more detailed block diagram of an example embodiment of the parallel frame delineator shown in FIG. 11.

FIG. 12 is a more detailed block diagram of an example embodiment of the parallel frame delineator 1102 shown in FIG. 11. The example embodiment of the parallel frame delineator 1102 comprises a multiplexer 1202 and a D-type flip-flop 1204. The multiplexer 1202 receives twenty-seven bits of data 606 from the three-stage pipeline shown in FIG. 4. The multiplexer 1202 also receives the position vector 608 from the parallel SOP detector 406 shown in FIG. 4. The multiplexer 1202 receives the position vector 608 on a select input of the multiplexer. The multiplexer 1202 selects nine bits of NRZI data 1108 from the incoming stream using the position vector 608 as a select signal. The flip-flop 1204 receives nine-bit fields of NRZI data 1108 and the SOP found flag 610. When the SOP found flag 610 is set, the flip-flop 1204 latches the nine-bits of NRZI data 1108. In other words, the position vector 608 is used to demultiplex a nine-bit field of NRZI data 1108 that represents valid data from the incoming twenty-seven bit data stream. The SOP found flag 610 is used to latch the valid data. The flip-flop 1204 provides a data valid signal 1110 and a nine-bit field of NRZI encoded data 1108 that is aligned with the SOP indicator. The NRZI encoded data 1108 and the data valid signal 1110 are available for the NRZI decoder 1104 shown in FIG. 11.

Figure 13:
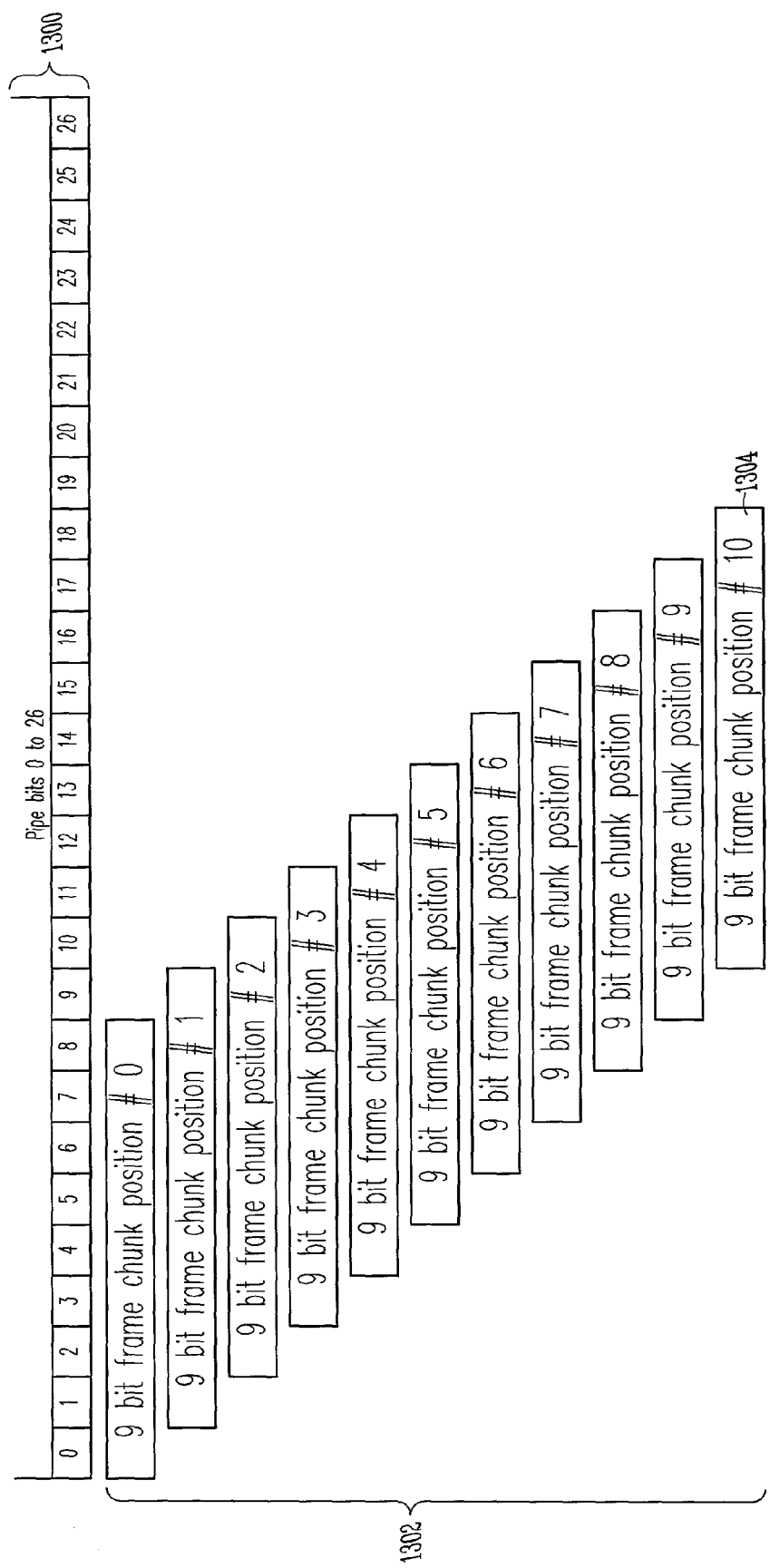
FIG. 13 is a block diagram showing eleven possible positions where an eight-bit SOP can be detected in an incoming twenty-seven-bit data stream if at least nine bits of USB data are to be recovered according to an example embodiment of the invention.

FIG. 13 is a block diagram of a twenty-seven bit data stream 1300. The twenty-seven bit data stream 1300 comprises bit positions 0–26. The most recently received bit in the twenty-seven bit data stream 1300 is in bit position 0. The least recently received bit in the twenty-seven bit data stream 1300 is in bit position 26. The block diagram in FIG. 13 shows the eleven possible positions where the valid nine-bit field of NRZI data can appear in the incoming twenty-seven-bit data stream according to an example embodiment of the invention. In an example embodiment, the valid nine-bit field of NRZI data can appear in one of ten different positions 1302. In the example embodiment shown in FIG. 13, a valid field of data is not shown in the right-most bit positions because the eight-bit pattern "00101010" would precede a valid field of data. If the "00101010" pattern is in the oldest, right-most possible location in the twenty-seven bit data stream 1300 (bit positions 19–26), then the nine-bit data field is in bit positions 10–18 (shown as reference number 1304).

Figure 14:
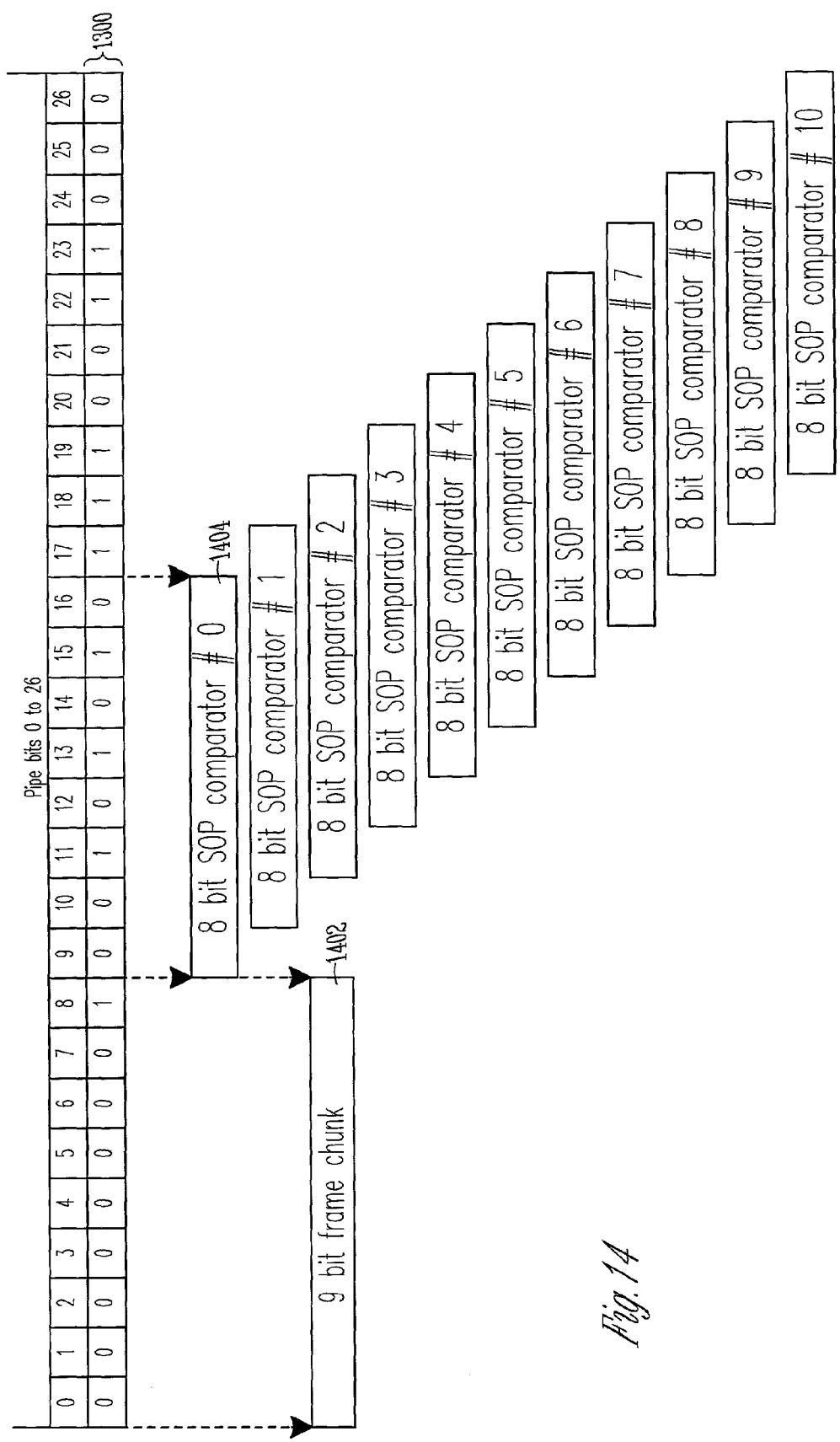
FIG. 14 is a block diagram of eleven concurrent comparators and the incoming twenty-seven bits of data as shown in the example embodiment in FIG. 7 and a nine-bit field of NRZI data.

FIG. 14 is a block diagram of eleven concurrent comparators and the incoming twenty-seven bits of data 1300 as shown in the example embodiment in FIG. 7 and a nine-bit field of NRZI data 1402 (also referred to herein as a nine-bit frame chunk). As shown in FIG. 14, the SOP indicator is identified by comparator #0 1404 in bit positions 9–16.

Figure 15:
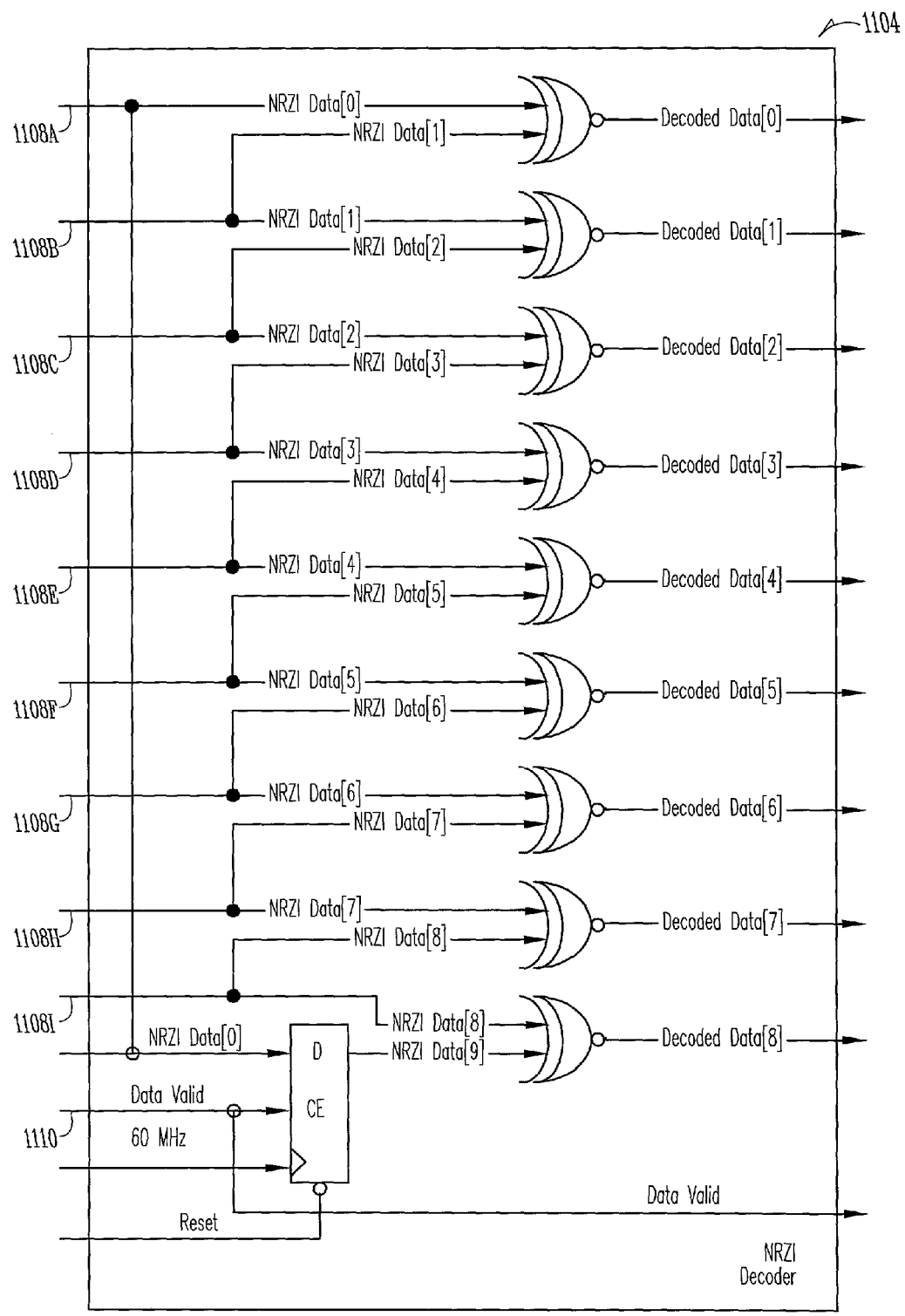
FIG. 15 is a more detailed block diagram of an example embodiment of the NRZI decoder shown in FIG. 11.

FIG. 15 is a more detailed block diagram of an example embodiment of the NRZI decoder 1104 shown in FIG. 11. The NRZI decoder 1104 receives a data valid signal 1110 and a nine-bit field of NRZI encoded data 1108A–1108I that is aligned using the SOP indicator. The NRZI encoded data 1108A–1108I and the data valid signal 1110 are available for the NRZI decoder 1104. In an example embodiment, the NRZI decoder 1104 comprises a plurality of inverted exclusive ORs (XOR). NRZI decoding occurs on the nine-bit field of NRZI encoded data 1108A–1108I received from the parallel frame delineator 1102 shown in FIG. 11). To decode a bit in the nine-bit field of NRZI encoded data 1108A–1108I, the NRZI decoder 1104 examines a bit and its preceding bit. If a transition occurs the bit is set to a logic zero, otherwise the bit is set to a logic one. In an example embodiment, the NRZI decoder 1104 is implemented by setting a present bit equal to an inverted XOR of the present and a preceding bit. In order to decode a first bit (in the example shown in FIG. 15, the first bit is NRZI Data[8]), a previous bit must be available. In the example embodiment shown in FIG. 15, the previous bit received (NRZI bit[0] from the previous data field or NRZI bit[9] from the current data field) is stored in a flip-flop. At startup bit[9] is initialized to a zero.

Figure 16:
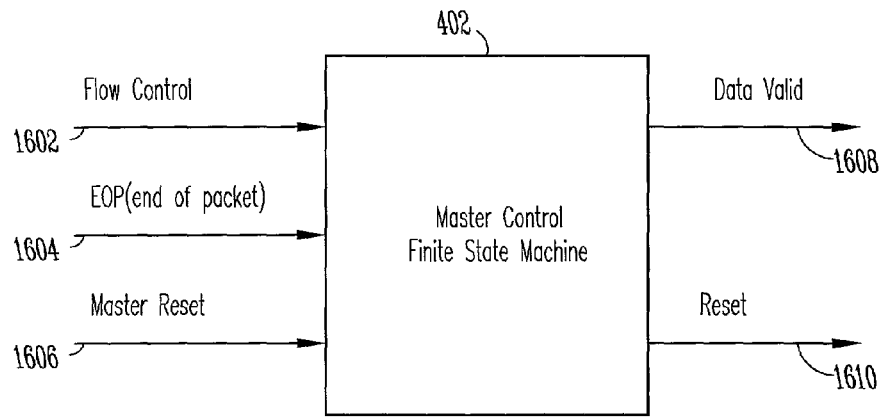
FIG. 16 is a block diagram of an example embodiment of the master control finite state machine shown in FIG. 4

Master Control State Machine. FIG. 16 is a block diagram of a master control finite state machine 402 shown in FIG. 4. A master control state machine 402 monitors an incoming flow control signal 1602, an end of packet (EOP) signal 1604 and a master reset signal 1606. The master control state machine 402 determines when the transceiver should be reset/cleared and when valid data is being received. The master control state machine 402 has two outputs: a data valid signal 1608 and a reset signal 1610.

Figure 17:
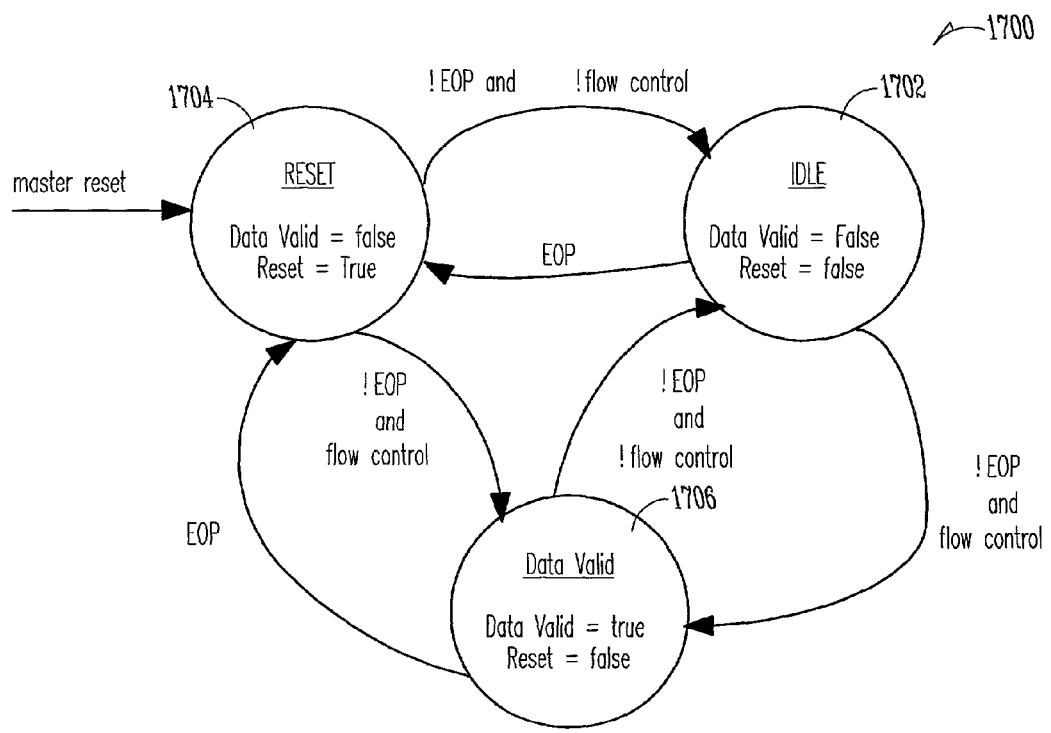
FIG. 17 is a more detailed diagram of a state machine for an example embodiment of the master control finite state machine shown in FIG. 16.

FIG. 17 is a more detailed diagram of a state machine for an example embodiment of the master control finite state machine 402 shown in FIG. 16. In the example embodiment shown in FIG. 17, the state machine 402 has three states: an idle state 1702, a reset state 1704 and a data valid state 1706. The outputs of the state machine 402 during the idle state 1702 are a false data valid signal (1608 in FIG. 16) and a false reset signal (1610 in FIG. 16). The outputs of the state machine 402 during the data valid state 1706 are a true data valid signal (1608 in FIG. 16) and a false reset signal (1610 in FIG. 16). The outputs of the state machine 402 during the reset state 1704 are a false data valid signal (1608 in FIG. 16) and a true reset signal (1610 in FIG. 16).

Embodiments of the three-stage pipeline, the parallel start-of-packet detector, and the parallel frame delineator/aligner and NRZI decoder have been described. In one embodiment, the start of packet (SOP) delineator is a sequence of alternating zeros and ones followed by two zeros in a row, for example; . . . 010100. The USB specification states that a minimum of six alternating zero and ones will be received followed by a pair of zeros. In one embodiment, concurrent comparators search for a "01010100" in the received data stream.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An integrated circuit comprising:
    a parallel frame delineation module having a plurality of concurrent comparators to delineate received frame boundaries within a Universal Serial Bus (USB) peripheral non-return to zero invert (NRZI) data stream; and
    an NRZI decoder module to decode received NRZI encoded data using parallel data processing.

2. The integrated circuit of claim 1, wherein the USB peripheral NRZI data stream follows a protocol defined in version 2.0 of the USB specification.

3. The integrated circuit of claim 2, wherein the parallel frame boundary delineation module comprises a three-stage pipeline.

4. The integrated circuit of claim 3, further comprising a pipeline control state machine.

5. The integrated circuit of claim 3, wherein the parallel frame boundary delineation module further comprises a parallel start-of-packet detector.

6. The integrated circuit of claim 5 wherein the parallel start-of-packet detector comprises eleven concurrent comparators.

7. An apparatus comprising:
one or more Universal Serial Bus (USB) connectors to couple to a communications channel carrying a USB data stream;
an application specific integrated circuit comprising a USB transceiver, a serial interface engine and apparatus-specific logic, the USB transceiver having concurrent comparators to delineate received asynchronous frame boundaries within the USB data stream and parallel logic to decode received encoded data.

8. The apparatus of claim 7, wherein the apparatus-specific logic comprises logic for an apparatus selected from the group consisting of: a hub, a digital camera, a video-conferencing camera, a printer, a keyboard, a scanner, a modem, a digital phone, a removable media drive, a CD/DVD drive, a gaming device, a hard drive, a mouse, a trackball, a pointer, a display device, a speaker and a networking device.

9. The apparatus of claim 7, wherein the parallel logic decodes non-return to zero invert (NRZI) encoded data.

10. A method of delineating asynchronous frame boundaries in a Universal Serial Bus (USB) data stream, the method comprising:
receiving a USB data stream;
searching for a frame delineation marker in the data received using concurrent comparators;
asserting a flag upon detection of the frame delineation marker; and
creating a vector indicating a location of a frame boundary in the data stream.

11. The method of claim 10, wherein the USB data stream comprises non-return to zero invert (NRZI) data.

12. The method of claim 11, wherein the NRZI data is received in nine-bit fields.

13. The method of claim 10, wherein the act of searching for a frame delineation marker is performed concurrently on a twenty-seven bit field of data.

14. The method of claim 13, wherein the frame delineation marker comprises "00101010".

15. The method of claim 10, wherein the act of searching is performed by eleven concurrent comparators.

16. The method of claim 10, wherein the vector created comprises an eleven-bit vector.

17. An integrated circuit comprising:
a three-stage pipeline to receive consecutive nine-bit fields of data from an incoming Universal Serial Bus (USB) data stream; and
a parallel start-of-packet detector having concurrent comparators to identify a frame delineation marker in the incoming USB data stream.

18. The integrated circuit of claim 17, further comprising a non-return to zero invert (NRZI) data decoder to decode the incoming USB data stream.

19. The integrated circuit of claim 18, further comprising a state machine to determine when the incoming USB data stream contains valid data.

* * * * *